United States Patent [19]

Inagaki

[11] Patent Number: 5,992,380
[45] Date of Patent: Nov. 30, 1999

[54] IGNITION TIMING CONTROL SYSTEM FOR INDUSTRIAL ENGINES

[75] Inventor: Hiroshi Inagaki, Aichi, Japan

[73] Assignee: NGK Spark Plug Co., Ltd., Nagoya, Japan

[21] Appl. No.: 09/042,462

[22] Filed: Mar. 16, 1998

[30] Foreign Application Priority Data

Mar. 18, 1997 [JP] Japan ................................. 9-064858

[51] Int. Cl.$^6$ ................................. F02P 5/15; F02P 1/00; F02D 41/08
[52] U.S. Cl. ................................. 123/339.11; 123/406.52; 123/406.56; 123/406.6
[58] Field of Search ................................. 123/339.11, 406.52, 123/506.56, 406.57, 406.6, 438, 361, 376

[56] References Cited

U.S. PATENT DOCUMENTS

| | | | |
|---|---|---|---|
| 4,378,769 | 4/1983 | Haubner et al. | 123/335 |
| 5,582,149 | 12/1996 | Kanno | 123/406.74 |
| 5,709,193 | 1/1998 | Svensson et al. | 123/438 |

FOREIGN PATENT DOCUMENTS

61-182467  8/1986  Japan .

Primary Examiner—Tony M. Argenbright
Assistant Examiner—Arnold Casino
Attorney, Agent, or Firm—Foley & Lardner

[57] ABSTRACT

An ignition timing control system for an industrial engine or small engines used on lawn mowers, etc. is provided. In such an industrial engine, a pulser coil outputs an alternating current signal in response to movement of a magnet which rotates together with an output shaft of the industrial engine. To the pulser coil, there are connected a detecting circuit for generating a timing signal corresponding to an angle of rotation of the output shaft in response to the signal from the pulser coil, a microcomputer for determining an engine speed in accordance with the timing signal and then determining an ignition timing in accordance with the determined engine speed, and a signal generating circuit for generating a signal for controlling the timing at which a spark plug is driven by an ignition drive unit. By advancing and retarding the ignition timing, the output of the engine can be controlled with responsiveness such that the stable operation of the engine can be obtained even when the air/fuel mixture is made leaner to such an extent that will inevitably cause hunting when the engine is operated under only a throttle valve opening and closing control by a governor.

12 Claims, 9 Drawing Sheets

IGNITION TIMING CONTROL SYSTEM FOR INDUSTRIAL ENGINES

BACKGROUND OF THE INVENTION

1. Field of the Invention

The present invention relates to an ignition timing control system for industrial internal combustion engines, particularly for small internal combustion engines used on small boats, small generators, lawn mowers, etc.

2. Description of the Related Art

For small-sized, simple structure and low cost, industrial engines such as those used in lawn mowers, etc. have heretofore been constructed so as to be ignited simply at a previously set constant timing without making such a complicated combustion control according to a driving condition as in automotive engines while being operated steadily at a predetermined rated speed by means of a governor which mechanically regulates a throttle opening according to the engine speed.

For supply of fuel, a carburetor constructed so as to utilizes vacuum produced at a venturi of an intake passage is used so that the engine can start smoothly without supply of electric power. For cooling of the engines, air cooling which features simple structure is employed.

However, air cooling is lower in the cooling ability as compared with water cooling which is widely used for automotive engines, etc., so the carburetor for the industrial engine is set so as to allow the air/fuel mixture to be considerably richer than the stoichiometric value for thereby supplementing the cooling ability by utilizing the heat of vaporization of the mixture. For this reason, the exhaust gasses emitted from the industrial engines contain a large amount of carbon monoxide (CO), hydrocarbon (HC), etc.

On the other hand, recently, there is a tendency to require even such industrial engines to decrease in the amount of noxious components contained in the exhaust gases. To meet such a requirement, it is necessary for the air/fuel mixture to be leaner and set so as to have such an air/fuel ratio adjacent the stoichiometric value.

However, when the setting of the carburetor is caanged for simply making leaner the air/fuel mixture supplied to the engine, there is caused such a problem that not only the durability of the engine is deteriorated due to the higher combustion temperature and exhaust gas temperature but a variation of the engine speed in response to a sudden variation of the load of the engine becomes larger and therefore it takes a longer time for the engine to return to a rated engine speed, and in the worst case hunting in operation of the engine occurs.

That is, in the event the air/fuel mixture is made leaner, increase of fuel supplied to the engine when, for example, engine speed becomes lower is retarded even if the governor is operated to make larger the throttle opening since the mixture is lean. As a result, the air/fuel mixture becomes further leaner and therefore the engine speed becomes further lower. Then, the increase of fuel supplied to the engine is executed as required to increase the engine speed. However, upon this time, the throttle opening has become too large, thus causing the engine speed to become too high. Then, the governor is operated so as to decrease the throttle opening. However, upon this time, the air/fuel mixture is lean and therefore decrease of fuel is carried out rapidly, thus causing the engine speed to become lower than required. From this time onward, the above described actions are repeated to cause hunting.

SUMMARY OF THE PRESENT INVENTION

According to an aspect of the present invention, there is provided a novel and improved ignition timing control system for an industrial internal corrbustion engine. The industrial engine has an ignition drive unit for driving a spark plug at a previously set ignition timing, the ignition drive unit being responsive to a control signal applied thereto for driving the spark plug at an ignition timing different from the previously set ignition timing, and a governor for variably controlling an opening degree of a throttle valve of the engine in accordance with an engine speed so that the engine operates at a predetermined rated speed. The ignition timing control system comprises engine speed detecting means for detecting an engine speed of the engine, ignition timing calculating means for calculating an ignition timing of the engine in accordance with the engine speed detected by the engine speed detecting means, and control signal generating means for generating a control signal for driving, by way of the ignition drive unit, the spark plug in accordance with the ignition timing calculated by the ignition timing calculating means.

In the thus structured ignition timing control system for an industrial internal combustion engine, the ignition timing calculating means calculates an ignition timing in accordance with the engine speed detected by the engine speed detecting means, and the signal generating means generates a signal for driving, by way of the ignition drive unit, the spark plug in accordance with the ignition timing calculated by the ignition timing calculating means.

Accordingly, with the ignition timing control system for an industrial engine according to the present invention, the ignition timing is controlled in accordance with the engine speed, whereby it becomes possible to control the output of the industrial engine with good responsiveness. As a result, in the event the engine output tends to become insufficient or excessive by only the throttle valve control, it becomes possible to make a compensation for such an insufficiency or excess, for example, it becomes possible to prevent hunting or the like occurring when a lean air/fuel mixture which is leaner than the conventional is supplied to the industrial engine. That is, according to the present invention, it becomes possible to attain stable operation of the industrial engine even when an air/fuel mixture supplied to the engine is made leaner than the conventional.

In the meantime, the adjustable range of the engine output by the ignition timing control is smaller as compared with that by the throttle valve control. However, in the industrial engine, the variation range of engine output at stationary driving is relatively small, so the engine output of the industrial engine can be controlled sufficiently by the ignition timing control.

Further, by the use of the ignition timing control system for the industrial engine according to the present invention, the operation of the industrial engine can be stabilized by the ignition timing control, and the generation of heat of the industrial engine can be suppressed or reduced as compared with the engine which is not controlled by the ignition timing control, thus enabling, even the air/fuel mixture supplied to the engine is made leaner than the conventional, the industrial engine to operate without causing any deterioration of the engine output.

Figure 9A:
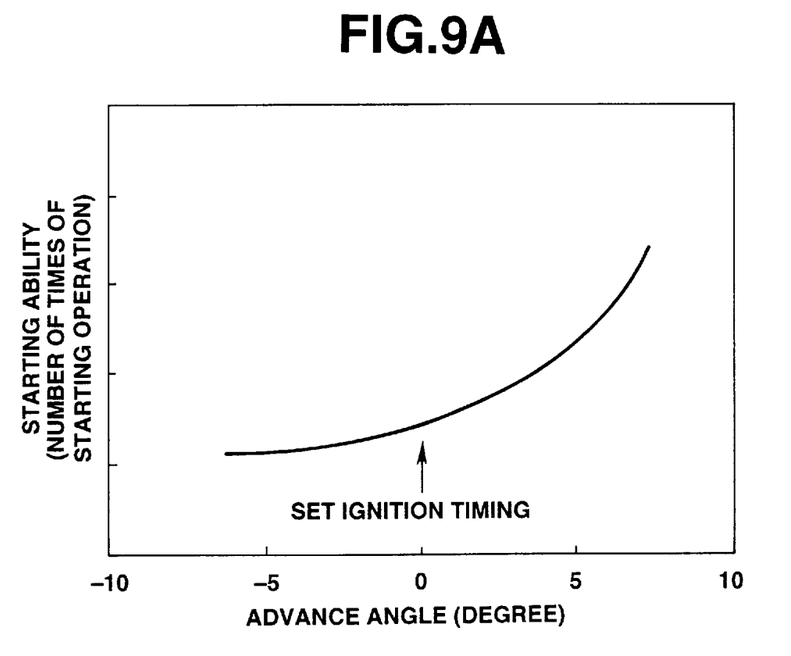
FIGS. 9A and 9B are graphic representations illustrating a starting ability and an engine output characteristic of an industrial engine in relation to an ignition timing advance.
Figure 9B:
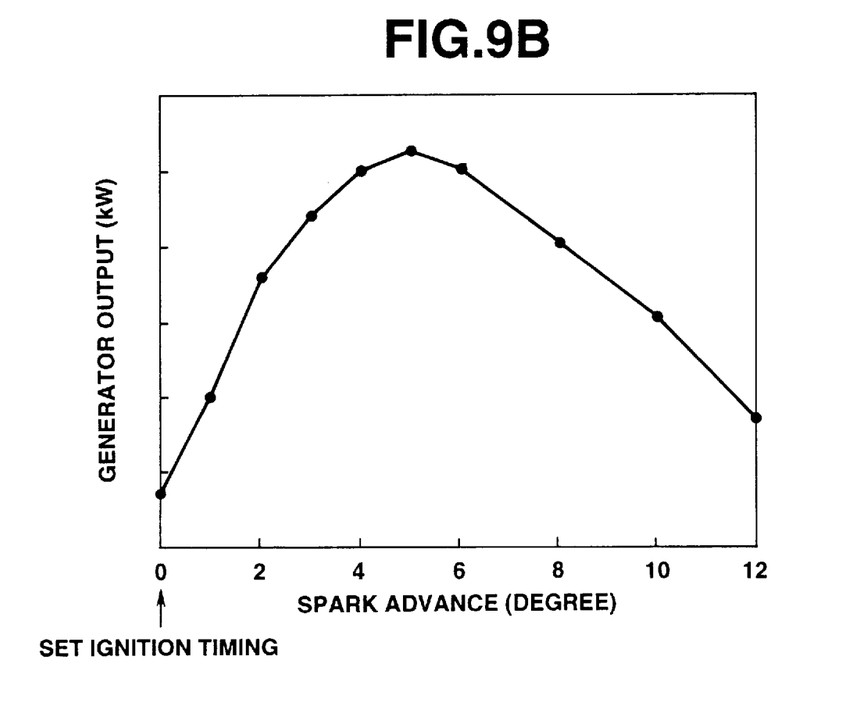

In the meantime, FIG. 9A is a graph showing a relationship between an industrial engine ignition timing and an industrial engine starting ability. FIG. 9B is a graph showing a relationship between an industrial engine ignition timing and an engine output when the throttle valve is fully opened.

As shown in FIGS. 9A and 9B, when the ignition timing is advanced by a certain amount or more, the industrial engine starting ability is deteriorated rapidly. On the other hand, the ignition timing that causes the maximum engine output exists in a relatively advanced ignition timing area where the industrial engine starting ability is deteriorated rapidly.

For this reason, the ignition timing of the conventional industrial engine is set to such a timing that is advanced as much as possible within a range where a certain starting ability is retained and resultantly to such a timing that is retarded more than that where the maximum output is obtained.

That is, the industrial engine is not operated by the spark timing where the maximum output is not obtained, so by advancing the ignition timing it becomes possible to make higher the engine output and therefore the engine speed, and on the other hand by retarding the ignition timing it becomes possible to make lower the engine output and therefore the engine speed.

Thus, by constructing the ignition timing calculating means so that when the engine speed becomes lower than the rated engine speed the ignition timing which is advanced from the ignition timing to which the ignition drive unit is previously set is calculated by the ignition timing calculating means, it becomes possible to allow the engine speed which becomes lower than the rated engine speed due to increase of the load, etc. to return to the rated engine speed rapidly.

On the other hand, by constructing the ignition timing calculating means so that when the engine speed becomes higher than the rated engine speed the ignition timing which is retarded from the ignition timing to which the ignition drive unit is previously set is calculated by the ignition timing calculating means, it becomes possible to allow the engine speed which becomes higher than the rated engine speed due to decrease of the load, etc. to return to the rated engine speed rapidly.

In the meantime, the industrial engine has such characteristics, due to the structure of the governor, in which the engine speed is held stably lower than the rated engine speed when the throttle valve is fully open, i.e., at high load, and resultantly the ignition timing enabling to attain the maxim output is retarded more than the ignition timing for allowing the engine to operate at the rated engine speed.

Thus, by constructing the ignition timing calculating means so that when the throttle valve is in a state of being fully open advancement of the ignition timing from the ignition timing to which the ignition drive unit is previously set is limited by the ignition timing calculating means, it never occurs that at high load where the throttle valve is in a state of being fully open the ignition timing is advanced more than required to make lower the engine output and deteriorate the control ability, thus making it possible to improve the reliability of the ignition timing control system.

According to a further aspect of the present invention, the engine speed detecting means comprises a pulser coil provided to the industrial engine for detecting a rotation of an output shaft of the engine magnetically and determines the engine speed from detected rotation of the output shaft by the pulser coil. By this, it can be made unnecessary an additional provision of a sensor or the like for detecting the engine speed, thus making it possible to simplify the structure of the ignition timing control system.

According to a further aspect of the present invention, the ignition timing control system further comprises electric power generating means for rectifying and smoothing an output of the pulser coil to generate a DC power and supplying the DC power to various portions of the ignition timing control system. By this, it can be made unnecessary provision of a battery or the like for operating the ignition timing control system, thus making it possible to make small-sized the ignition timing control system.

The above described structure can solve the above noted problems inherent in the prior art system.

It is accordingly an object of the present invention to provide a novel and improved industrial engine ignition timing control system which enables stable operation of the industrial engine under a condition of being supplied with an air/fuel mixture of a high air/fuel ratio (i.e., a lean air/fuel mixture).

It is a further object of the present invention to provide a novel and improved industrial engine ignition timing control system which can reduce the noxious components contained in the engine exhaust gases with efficiency and is thus quite desirable and useful from an antipollution point of view.

DETAILED DESCRIPTION OF PREFERRED EMBODIMENT

Referring to FIGS. 1 to 6, inclusive, an industrial engine ignition timing control system according to an embodiment of the present invention will be described.

Figure 2:
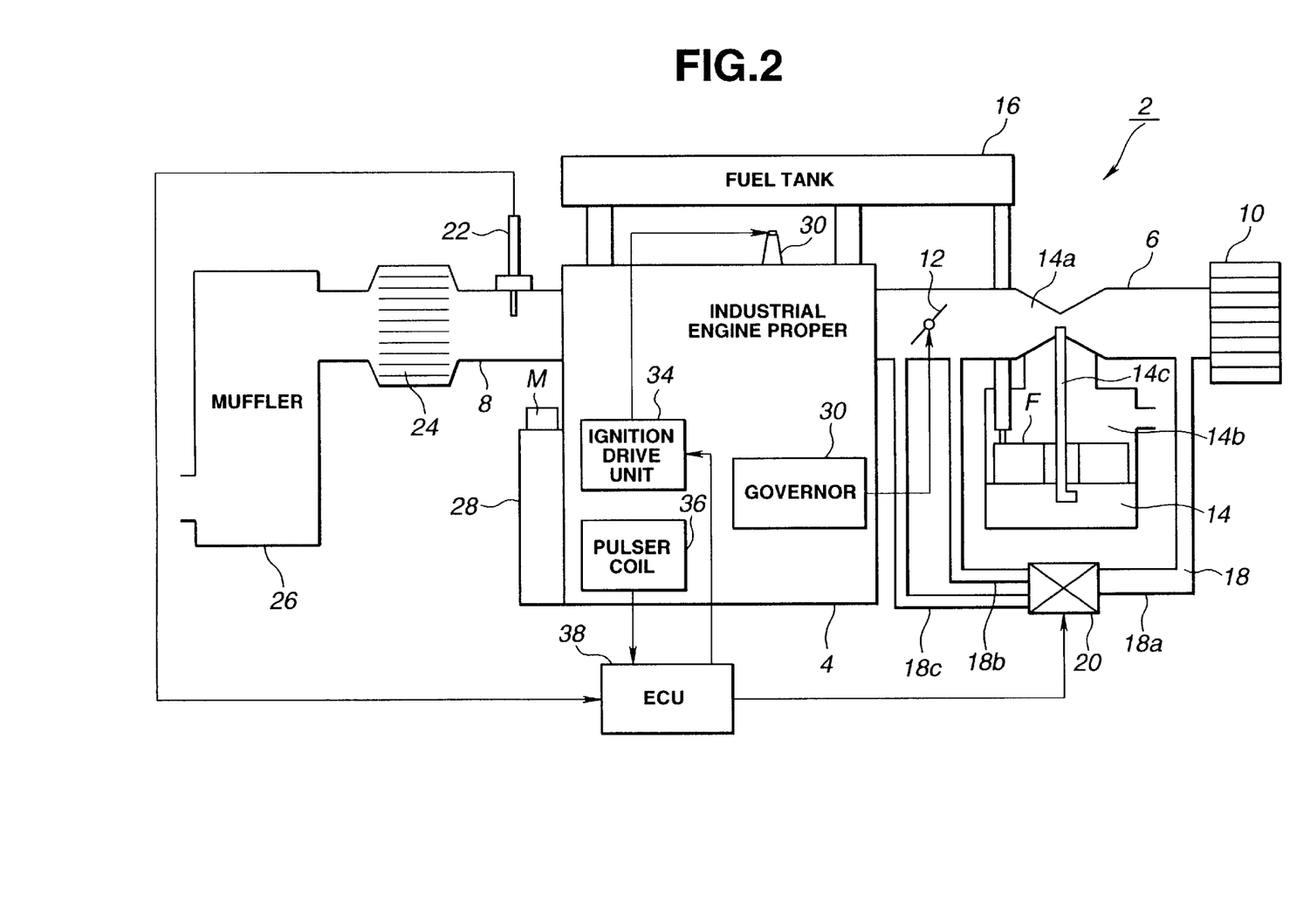
FIG. 2 is a schematic diagram illustrating an entire structure of an industrial engine incorporating the ignition timing control system of FIG. 1.

In FIG. 2, an industrial internal combustion engine incorporating an ignition timing control system according to an embodiment of the present invention is generally indicated by 2 and includes an engine proper 4 having cylinders, etc. for combusting an air/fuel mixture, an intake pipe 6 for inducting air from the outside and supplying it to the cylinders, and an exhaust pipe 8 for discharging the exhaust gases emitted from the cylinders to the outside.

The intake pipe 6 has attached thereto an air cleaner 10 for filtration of intake air, a throttle valve 12 for controlling the amount of intake air, and a carburetor 14 for supplying fuel to the inside of the intake pipe 6.

The carburetor 14 includes a Venturi or choke tube 14a constituted by an intake pipe 6 portion with a narrower center section, a float chamber 14b for storing the fuel supplied thereto from a fuel tank 16 while making adjustment of the amount of fuel through up and down movement of a float F, and a nozzle 14c for providing communication between the float chamber 14b and the venturi 14a for supplying fuel to the intake pipe 6. The carburetor 14 is constructed so as to utilize the vacuum produced at the venturi 14a for supply of fuel.

The intake pipe 6 further includes a bypass passage 18 for bypassing the ventruri 14a and supplying air to intake pipe 6 portions upstream and downstream of the throttle valve 12. To the bypass passage 18 is provided a solenoid valve 20 movable between two positions, i.e., an open position and closed position for opening and closing the bypass passage 18, respectively. In the meantime, the bypass passage 18 includes a single passage section 18a between an inlet positioned on the intake pipe 6 adjacent the air cleaner 10 and the solenoid valve 20 and bifurcated passage sections 18b and 18c between the solenoid valve 20 and outlets positioned on the intake pipe 6 adjacent the throttle valve 12. The passage section 18b connected to the intake pipe 6 portion upstream of the throttle valve 12 is thicker, i.e., has a larger sectional passage area, whereas the passage section 18c connected to the intake pipe 6 portion downstream of the throttle valve 12 is thinner, i.e., has a smaller sectional passage area.

On the other hand, to the exhaust pipe 8 are attached an oxygen sensor 22 for detecting an oxygen gas contained in the exhaust gases, an exhaust gas purifying catalyst 24 for purification of the exhaust gases, and a muffler 26 for reduction of an exhaust sound. In the meantime, used as the oxygen sensor 22 is an oxygen concentration cell consisting of a zirconia solid electrolytic substrate and a pair of platinum electrodes disposed on the opposite sides of the substrate and is of the type which produces such an electromotive force that changes abruptly around a predetermined air/fuel ratio (herein, A/F=14.3), i.e., a so-called theoretical air/fuel ratio sensor.

The engine proper 4 includes an output shaft 27 (refer to FIG. 1) for output of an engine power. To the output shaft 27 are attached a flywheel 28 having cooling fins and a governor 30 for changing the opening degree of the throttle valve 12 in accordance with the engine speed.

Further, adjacent the flywheel 28 there are provided an ignition drive unit 34 for generating, in response to passage of a magnet M attached to the flywheel 28 in close proximity thereof, a high voltage for driving or energizing a spark plug 32 and a pulser coil 36 for generating an alternating current in response to passage of the magnet M in close proximity thereof.

The signals from the pulser coil 36 and the oxygen sensor 22 are inputted to an electronic control unit (ECU) 38 which controls the operations of the ignition drive unit 34 and the solenoid valve 20 in accordance with the inputted signals.

Figure 1:
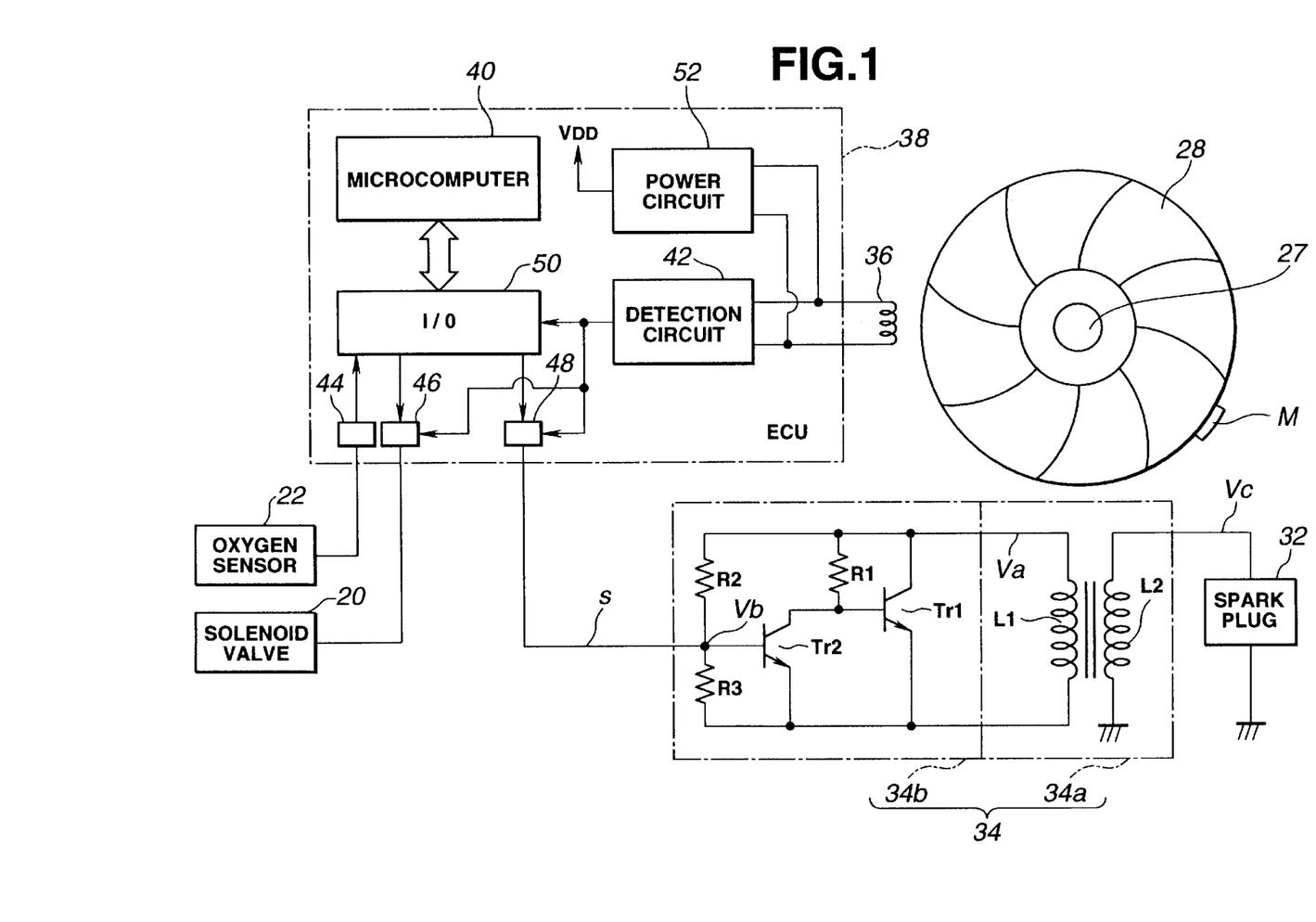
FIG. 1 is an electrical circuit diagram illustrating an important portion of an industrial engine ignition timing control system according to an embodiment of the present invention.

FIG. 1 shows how the ignition drive unit 34 and the ECU 38 are structured.

As shown in FIG. 1, the ignition drive unit 34 consists of an ignition coil assembly 34a including a primary coil L1 for generating a current in response to passage of the magnet M in close proximity thereof and a secondary coil L2 connected to the spark plug 32, and an igniter 34b including a transistor Tr1 connected at a collector to one end of the primary coil L1 and at an emitter to the other end of the primary coil L1, a resistor R1 connected between the collector and the base of the transistor Tr1 for supplying a base current to the transistor Tr1, a transistor Tr2 connected at an emitter to the emitter of the transistor Tr1 and resistors R2 and R3 supplying a fraction of the voltage across the opposite ends of the primary coil L1 to the base of the transistor Tr2.

Figure 3:
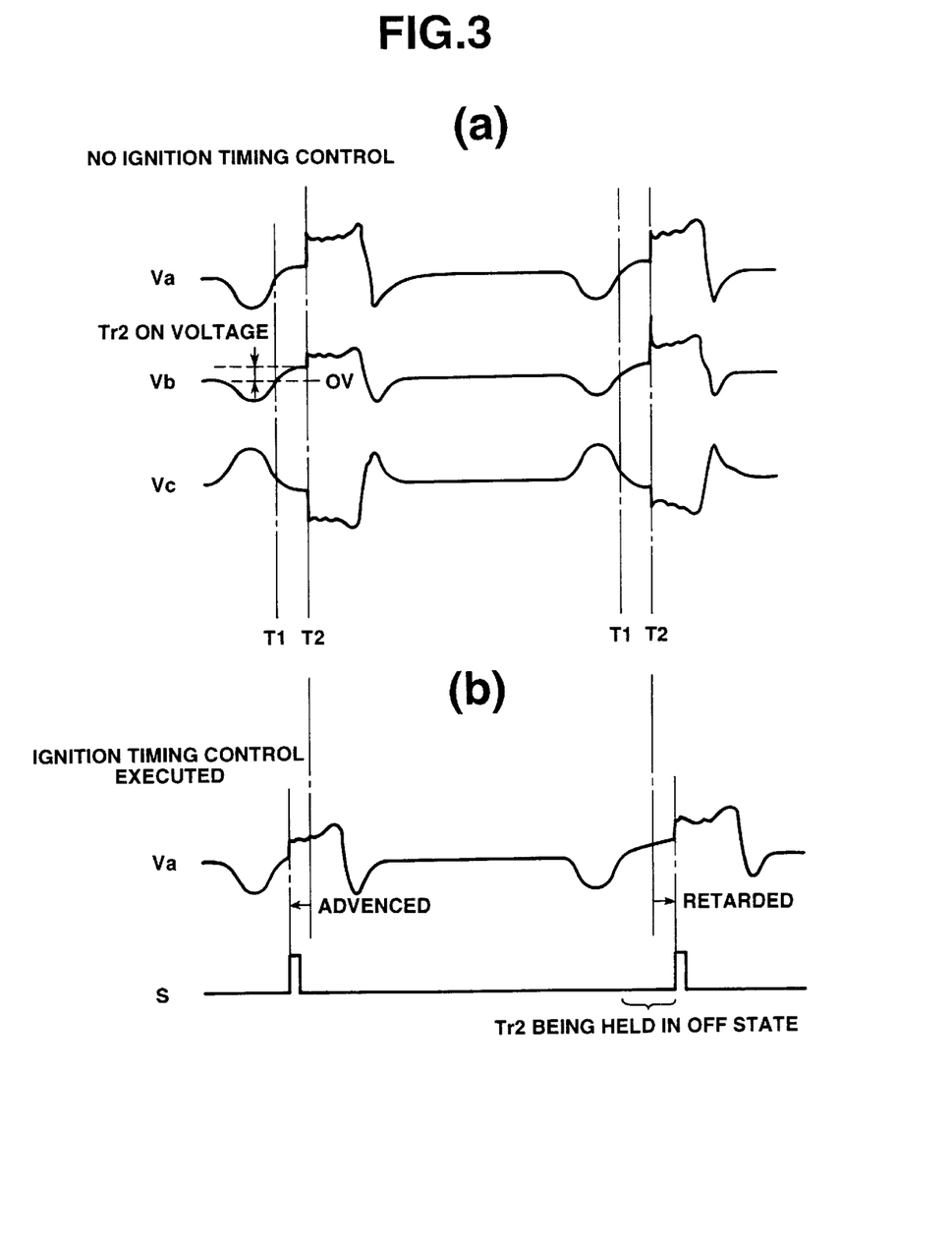
FIG. 3 is a waveform illustration of the operation of the ignition timing control system of FIG. 1.

Referring now to FIG. 3, the operation of the ignition drive unit 34 structured as above will be described. FIG. 3-(a) shows waveforms of a voltage Va across the opposite ends of the primary coil L1 (i.e., emitter voltage of transistor Tr1), a partial voltage Vb obtained by the operation of the resistors R1 and R3 (i.e., the base voltage of the transistor Tr2), and a voltage Vc across the opposite ends of the secondary coil L2 (i.e., voltage applied to the spark plug 32).

As shown in FIG. 3-(a), when the magnet M passes in close proximity of the ignition coil 34a (at the time T1), there is induced in the primary coil L1 an electromotive force that is positive on the collector side of the transistor Tr1, thus causing current to be supplied to the base of the transistor Tr1 by way of the resistor R1 and thereby causing the transistor Tr1 to be turned on. By this, current flows through a closed loop constituted by the primary coil L1 and the transistor Tr1.

Thereafter, when the collector current of the transistor Tr1 is saturated, the voltage Va across the opposite ends of the primary coil L1 rises, thus allowing the partial voltage Vb at the junction of the resistors R2 and R3 to rise. When the partial voltage Vb exceeds beyond the ON voltage of the transistor Tr2 (at the time T2), the transistor Tr2 is turned on, thus allowing the transistor Tr1 to be turned off. Thereupon, the current flow through the primary coil L1 is shut off such that a high voltage is induced in the secondary coil L2. The high voltage is applied to the spark plug 32 and allows it to produce electric sparks.

In the meantime, to the base of the transistor Tr2 constituting the igniter 34b is connected a signal line for applying thereto a control signal S from the ECU 38. By this, ON/OFF of the transistor Tr2, i.e., shutoff of the current flow through the primary coil L1 and therefore the ignition timing of the spark plug 32 can be controlled by the ECU 38.

That is, as shown in FIG. 3-(b), in the event the transistor Tr2 is forcedly turned on by the control signal S before the partial voltage Vb resulting from the operation of the resistors R2 and R3 reaches the ON voltage of the transistor Tr2, the ignition timing of the spark plug 32 is advanced. Further, in the event the transistor Tr2, with its base voltage being forcedly held lower than the ON voltage by means of the control signal S, is turned on at the timing later than the normal ignition timing (the time T2), the ignition timing of the spark plug 32 is retarded. In the meantime, FIG. 3-(b) shows waveforms of a control signal S and a voltage Va across the opposite ends of the primary coil L1 resulting from application of the control signal S.

The ECU 38 includes as a major component a known microcomputer 40 having CPU, ROM, RAM, etc. and further includes a detection circuit 42 for detecting the passage of the magnet M based on the output of the pulser coil 36 and generating a pulsed timing signal, an oxygen sensor drive circuit 44 for driving the oxygen sensor 22 and taking out therefrom a detection signal, a solenoid valve drive circuit 46 for driving the solenoid valve 20 in timed relation to a timing signal from the detection circuit 42, a signal generating circuit 48 for generating a control signal S to the igniter 34b in timed relation to a timing signal from the detection circuit 42, an I/O circuit 50 for inputting and outputting signals to and from the computer 40 by way of the circuits 42, 44, 46 and 48, and an electric power circuit 52 for supplying electric power to various portions of the ECU 38.

The microcomputer 40 executes controls such as an air/fuel ratio control for controlling the solenoid valve 20 in such a manner the air/fuel ratio is maintained constant and a spark advance control for controlling the ignition timing of the spark plug 32, in accordance with the detection signal from the oxygen sensor 22 and the timing signal from the pulser coil 36.

The solenoid valve drive circuit 46 is constructed so as to open and close the solenoid valve 20 in accordance with the duty cycle determined by the microcomputer 40 and furthermore in timed relation to the timing signal from the detection circuit 42. Further, the signal generating circuit 48 outputs control signals S in three states, i.e., a high level state, low level state and high impedance state, and adapted to output a control signal in a high impedance state when it is not controlled.

Figure 4:
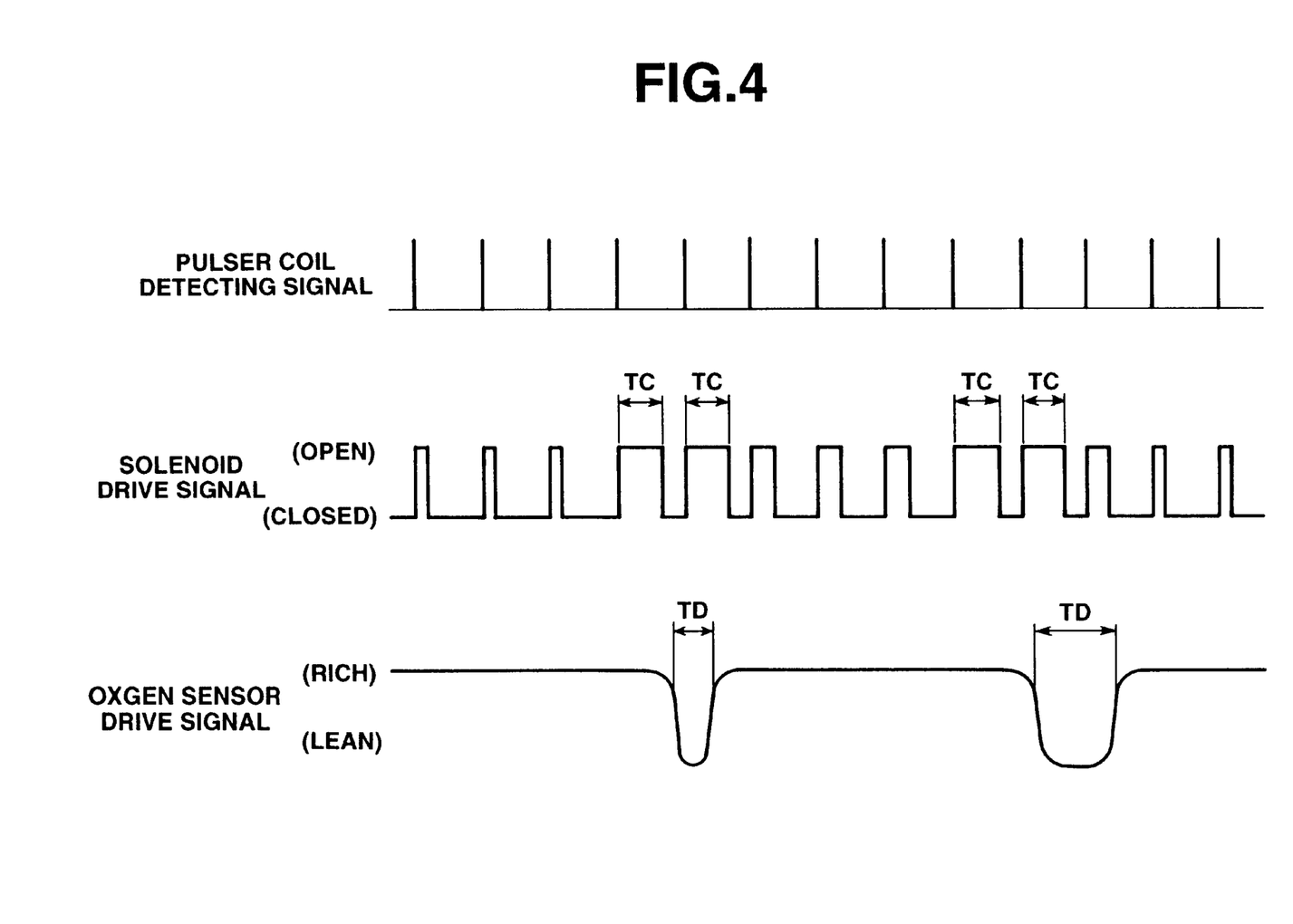
FIG. 4 is a time chart illustrating an air/fuel ratio control of the industrial engine of FIG. 2.

FIG. 4 is a time chart illustrating the outline of the air/fuel ratio control executed by the microcomputer 40.

To the solenoid valve 20 is fed, as shown in FIG. 4, a long open time TC coamand signal several times (herein, twice), and a resulting lean inverted time TD during which the detection signal of the oxygen sensor 22 is inverted to a lean side (i.e., the detection signal indicates that the mixture is lean) is measured. The duty ratio or cycle for opening and closing of the solenoid valve 20 is determined in such a manner as to allow the open time of the solenoid valve 20 to become shorter in the event the lean inverted time TD is shorter than a predetermined threshold value and longer in the event the lean inverted time TD is longer than the predetermined threshold value.

That is, in the event the air/fuel mixture is rich from the first when a long open time TC command signal is fed to the solenoid valve 20, the output of the oxygen sensor 22 once inverted to the lean side will soon return to the rich side (i.e., the side where the output indicates that the mixture is rich). Inversely, in the event the air/fuel mixture is lean from the first when the longer open time TC command signal is fed to the solenoid valve 20, the output of the oxygen sensor 22 will remain on the lean side for a longer time. Thus, by determining the duty cycle for the opening and closing of the solenoid valve 20 in the above described manner, the amount of intake air is increased and decreased.

In the meantime, the air/fuel ratio control is described in detain in U.S. patent application Ser. No. 08/878,775 and European patent application 97109913 which are both assigned to the same assignee of this application, so further description thereto is omitted for brevity.

Figure 5:
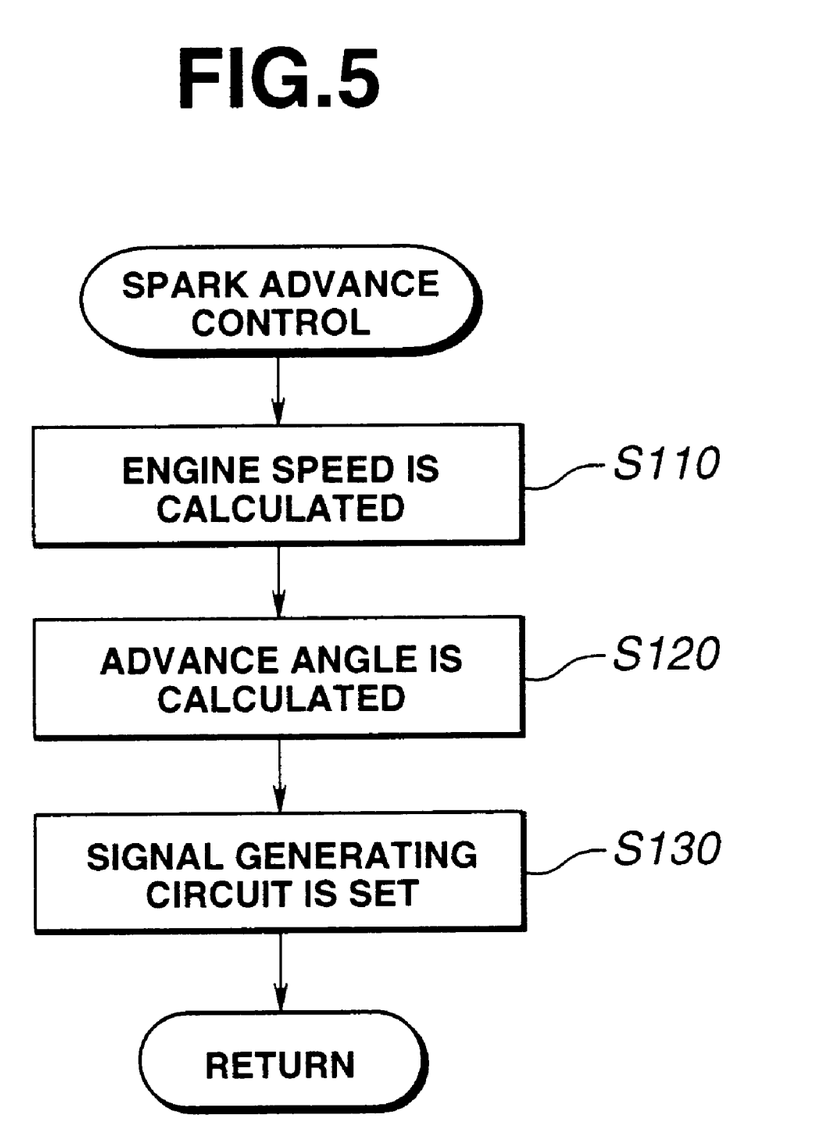
FIG. 5 is a flowchart illustrating an ignition timing advance control executed by a microcomputer of the ignition timing control system of FIG. 1.

Then, the ignition timing control executed by the microcomputer 40 will be described with reference to the flowchart of FIG. 5.

In the meantime, this control is got to start when electric power is supplied from the electric power circuit 52 to the microcomputer 40 and is repeated during continuation of the supply of electric power.

Firstly, at S110, engine speed is calculated based on the timing signal from the detection circuit 42. This is obtained with ease, for example, from the interval at which the timing signals are generated.

Then, at S120, an optimum spark advance is determined based on the engine speed calculated at S110. In the meantime, in the ROM of the microcomputer 40 is stored beforehand a table with respect to correspondence or relation between the engine speed and the spark advance, so that the spark advance is determined based on the engine speed by using this table.

Figure 6:
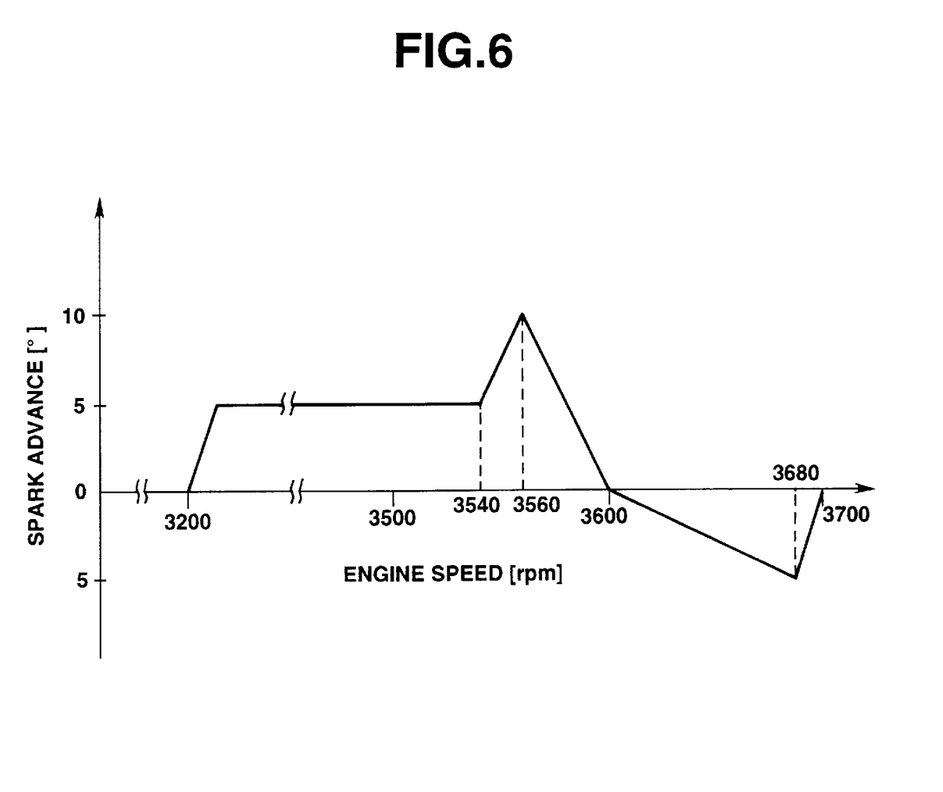
FIG. 6 is a graphic representation illustrating an ignition timing advance for an engine speed, which is executed in the industrial engine ignition timing control system of FIG. 1.

In the meantime, as shown in FIG. 6, the table for determining the spark advance in accordance with the engine speed is constructed such that the spark advance at the time when the igniter 34b is not controlled by the ECU 38, i.e., a spark advance previously set on consideration of the starting ability of the engine is taken as 0° or basis (hereinafter will be referred to as a set spark angle) and held at 0° when the engine speed is in the range from 0 to 3200 rpm and at 5° when the engine speed is in the range from 3200 to 3540 rpm while increasing gradually from 5 to 10° with increase of the engine speed in the range from 3540 to 3560 rpm and decreasing gradually from 10 to 0° with increase of the engine speed in the range from 3560 to 3600 rpm. The table is further constructed such that the spark advance decreases gradually from 0 to −5° with increase of the engine speed in the range from 3600 to 3680 and increases gradually from −5 to 0° with increase of the engine speed in the range from 3680 to 3700 rpm.

In the meantime, the above described setting of the spark angle is for use in an industrial engine which produces a maximum output when the spark is advanced relative to the set spark advance by about 10° in the event the engine speed is equal to or higher than 3560 rpm and by about 5° in the event the engine speed is equal to or lower than 3540 rpm at which the engine speed converges when the throttle is fully opened.

Then, at S130, the signal generating circuit 48 is set in accordance with the spark angle determined at S120 and is made to output a control signal S to the igniter 34b.

That is, a rotation angle for detection of the timing signal is constant, so that by calculating the timing of the spark advance in terms of a time starting at the timing signal and feeding the calculated time to the signal generating circuit 48, the signal generating circuit 48 outputs a control signal S in accordance with the calculated time and the timing signal.

More specifically, when the controlled spark advance is 0°, the spark plug 32 can be driven with the set spark angle of the igniter 34b (spark advance is 0°) by holding the control signal S at high impedance. Further, when the controlled spark advance is negative, the control signal S is once set to a low level prior to the timing of the set spark angle so that shutoff of current is not performed at the set spark angle by the igniter 34b, and thereafter set to a high level (or high impedance) at the calculated timing, whereby the spark plug 32 can be driven at the timing later than the set spark angle (i.e., at the retarded spark angle). Further, when the controlled spark advance is positive, the control signal S is simply set to a high level at the calculated timing, whereby the spark plug 32 can be driven at the timing earlier than the set spark angle (i.e., at the advanced spark angle).

Figure 7:
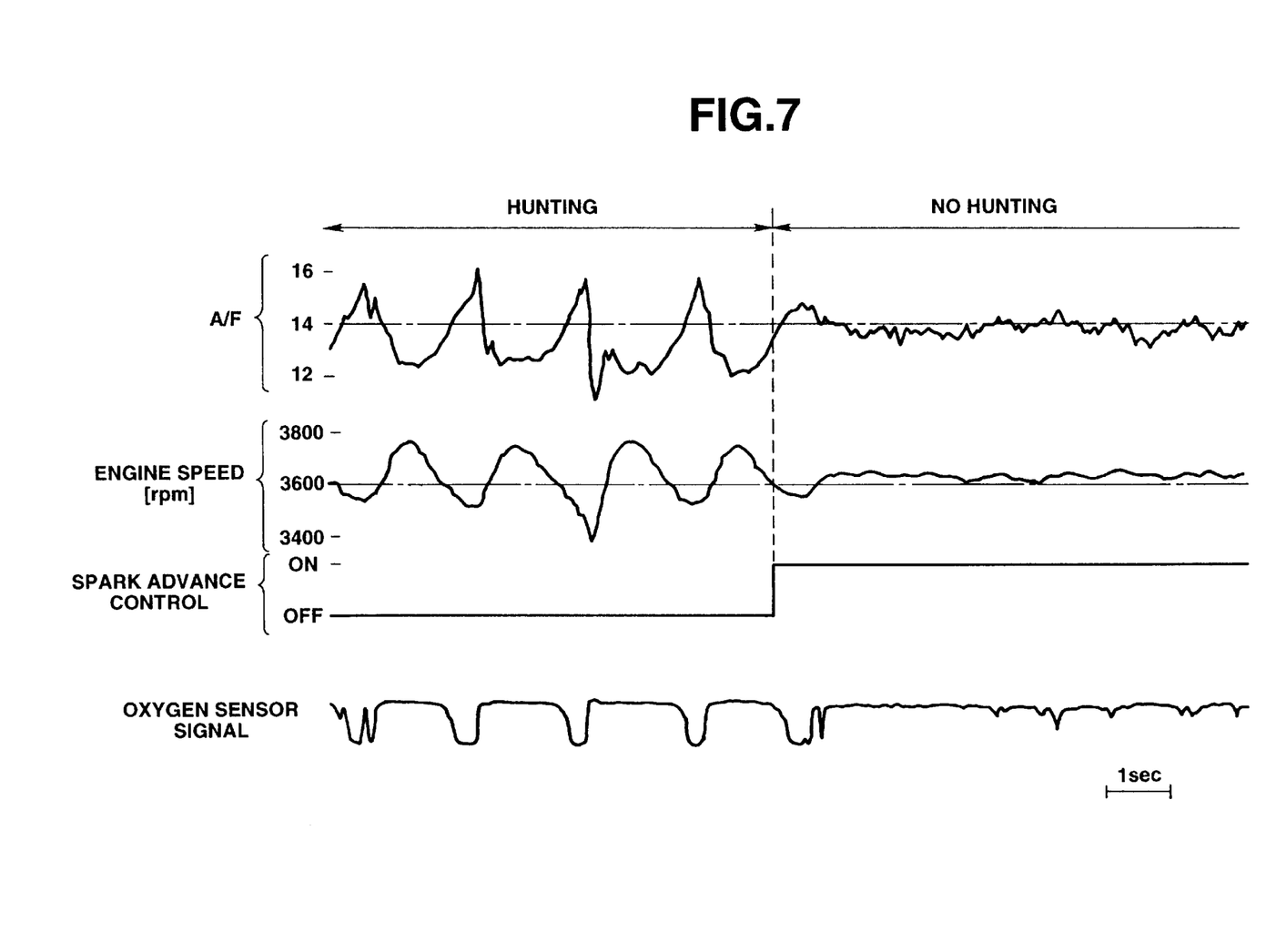
FIG. 7 is a graphic representation illustrating a result of measurement on a hunting preventing effect attained by an ignition timing advance control which is executed by the industrial engine ignition timing control system of FIG. 1.

FIG. 7 is a graphical representation of the result of the test for the operation of the industrial engine 2, the test being carried out under the condition that the carburetor 14 and the governor 30 were first set so that the industrial engine can operate optimally under the condition where the air/fuel mixture was rich (herein, A/F=12) as the conventional industrial engine and then only the carburetor 14 was adjusted so that the industrial engine 2 was operable with supply of a lean air/fuel mixture (herein, A/F=14) under the air/fuel ratio control by means of the oxygen sensor 22 and the solenoid valve 20.

As shown in FIG. 7, at the time when the spark advance control is not perfomed (OFF), i.e., when the output of the engine is controlled by only the throttle valve 12 opening and closing control by means of the governor 30, the air/fuel ratio and the engine speed become unstable to hunt. However, when the spark advance control is executed (ON), such hunting converges to make stable both the air/fuel ratio (adjacent A/F=14) and the engine speed (adjacent 3600 rpm).

Figure 8A:
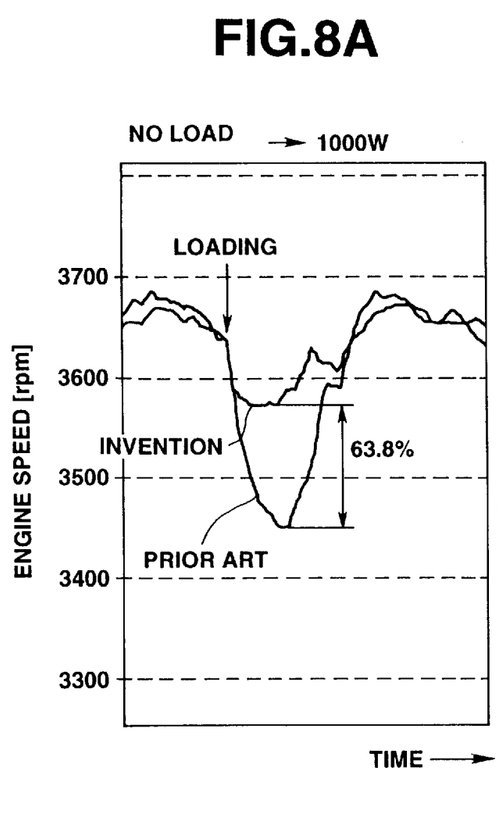
FIGS. 8A to 8C are graphic representations illustrating a result of measurement on a transient response improving effect attained by an ignition timing advance control which is executed by the industrial engine ignition timing control system of FIG. 1.
Figure 8B:
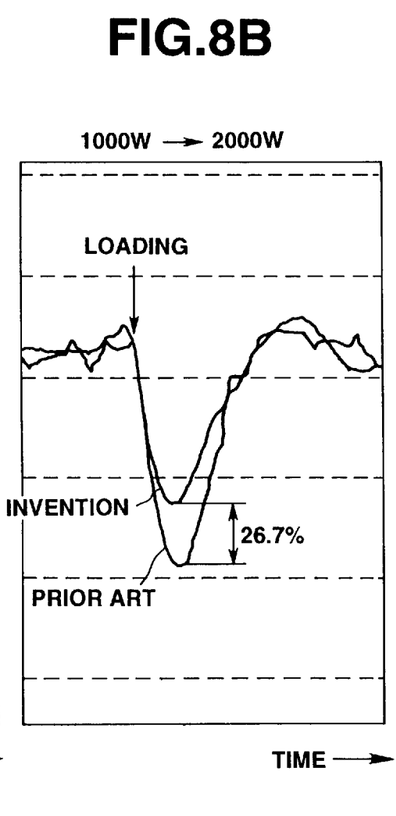
Figure 8C:
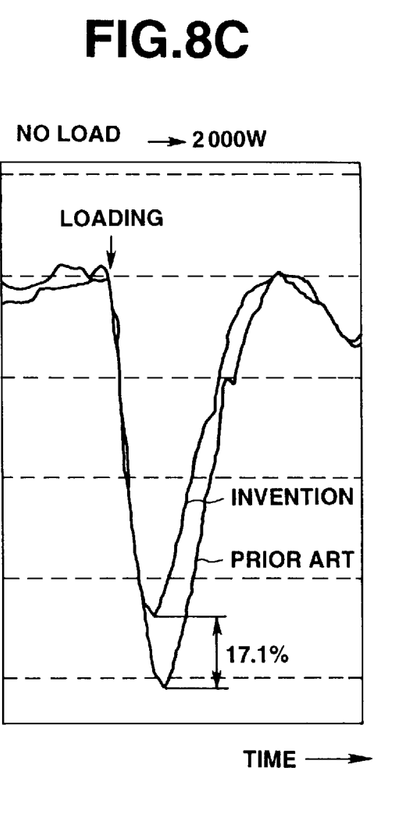

FIG. 8 is a graphical representation of the result of measurement which was made, by connecting a dynamo to the engine output shaft 27 to serve as a load, on a variation of engine speed (transient response) resulting just after the load was applied to the engine in case of operation under the above described spark advance control and in the case of operation under the same condition as that of the conventional industrial engine.

As shown in FIG. 8A, in the event the engine in a state of being not loaded is subjected to loading of 1000 W, the transient response is improved by 63.8% as compared with the case where the spark advance is not performed. Further, as shown in FIG. 8B, in the event the load is increased from 1,000 W to 2,000 W, the transient response is improved by 26.7%. Further, as shown in FIG. 8C, in the event the engine in a state of being not loaded is subjected to loading of 2000 W, the transient response is improved by 17.1%.

It will be understood that the industrial engine 2 of this embodiment can reduce a variation of the engine speed in response to a variation of the load and effect a stable operation.

As having been described as above, the industrial engine 2 according to an embodiment of the present invention is constructed so as to carry out such a spark advance control wherein the spark is advanced in the event the engine speed becomes lower than a rated engine speed, for thereby making higher the engine output (engine speed), and inversely the spark is retarded in the event the engine speed becomes higher than the rated engine speed, for thereby decreasing the engine output (engine speed). Thus, even when the engine speed varies due to a variation of load, etc., the engine speed can be returned to the rated engine speed with a good response, thus making it possible to improve the stability of the engine operation (engine speed).

Further, in the industrial engine 2 of this embodiment, the spark is not simply advanced in accordance with decrease of the engine speed but limitedly advanced so that the spark advance enables the engine to produce a maximum output at or adjacent the speed to which the speed of the engine which is operated with the throttle valve being fully open is settled down or converged, thus making it possible to improve the output and the fuel consumption under high load engine operating conditions.

Further, in this embodiment, supply of power for driving the ECU 38 and detection of the timing signal necessary for the spark advance control are carried out by the use of the purser coil 36 which the industrial engine is generally equipped with. Thus, even in the conventional engine, an improved stability of engine output and exhaust gas purification can be attained with ease only by attachment of the ECU 38 and replacement of the igniter 34b to the type which is controllable by the ECU 38.

Further, the system can be small-sized since a battery for driving the ECU 38 is unnecessary.

While the present invention has been described and shown as above, it is not for the purpose of limitation but various modifications and variations thereof can be made without departing from the scope of the appended claims.

For example, while in the above described embodiment both the spark advance and spark retardation are executed at the time of control of the igniter 34b by the ECU 38, the control by the ECU 38 can be modified so as to execute only the spark advance by advancing the set spark angle of the igniter 34b by 5° so that each spark timing for the engine speed in the range from 3200 to 3700 rpm is advanced by 5°.

Further, while the present invention has been described and shown as being embodied in the industrial engine 2 which is equipped with an oxygen sensor 22 and constructed so as to be capable of executing an air/fuel ratio control by driving a solenoid valve 20 provided to a bypass passage for intake air, it may be applied to an industrial engine which is simpler in structure and is not provided with an oxygen sensor 22, bypass passage 18 and solenoid valve 20.

What is claimed is:

1. An industrial internal combustion engine adapted to operate on an air/fuel mixture of an air/fuel ratio which is leaner than the stoichiometry, the engine comprising:

a governor for variably controlling an opening degree of a throttle valve of the engine so that the engine operates at a predetermined constant speed; and an ignition timing control system for controlling an ignition timing of the engine and thereby maintaining the predetermined constant engine speed in cooperation with said governor;

said ignition timing control system including an engine speed detector for detecting an engine speed of the engine, an ignition timing calculator for calculating an ignition timing on the basis of said engine speed detected by said engine speed detector, and a control signal generator for generating a control signal.

2. The engine according to claim 1, wherein said ignition timing calculated by said ignition timing calculator is advanced from a previously set ignition timing of the ignition timing control system when said engine speed is lower than said predetermined constant engine speed.

3. The engine according to claim 2, wherein advancement of said ignition timing from the previously set ignition timing of the ignition timing control system is limited when a throttle valve is in a state of being fully open.

4. The engine according to claim 1, wherein said ignition timing calculated by said ignition timing calculator is retarded from the predetermined ignition timing of the ignition timing control system when said engine speed is higher than said predetermined constant engine speed.

5. The engine according to claim 1, wherein said engine speed detector comprises a pulser coil provided to the engine for detecting a rotation of an output shaft of the engine magnetically and determines said engine speed from the detected rotation of said output shaft by said purser coil.

6. The engine according to claim 5, further comprising electric power generating means for rectifying and smoothing an output of said pulser coil to generate a DC power and supplying the DC power to various portions of the ignition timing control system.

7. An ignition timing control system in an industrial internal combustion engine having an ignition drive unit for driving a spark plug at a previously set ignition timing, the ignition drive unit being responsive to a signal applied thereto for driving a spark plug at an ignition timing different from the previously set ignition timing, and a governor for variably controlling an opening degree of a throttle valve of the engine in accordance with an engine speed so that the engine operates at a predetermined rated speed, said ignition timing control system comprising:

a detector for detecting an engine speed of the engine and generating a signal representative thereof;

a calculator responsive to the signal from said detector for calculating an ignition timing of the engine and generating a signal representative of a calculated ignition timing; and a control signal generator responsive to the signal from said calculator for outputting a control signal to the ignition drive unit for driving said spark plug in accordance with said calculated ignition timing so that the engine is operated at said predetermined rated speed.

8. The ignition timing control system according to claim 7, wherein said calculated ignition timing is advanced from the previously set ignition timing of the ignition drive unit when said engine speed is lower than said predetermined rated engine speed.

9. The ignition timing control system according to claim 8, wherein advancement of said ignition timing from the previously set ignition timing of the ignition drive unit is limited when the throttle valve is in a state of being fully open.

10. The ignition timing control system according to claim 7, wherein said calculated ignition timing is retarded from the predetermined ignition timing of the ignition drive unit when said engine speed is higher than said predetermined rated engine speed.

11. The ignition timing control system according to claim 7, wherein said engine speed detector comprises a pulser coil provided to the industrial engine for detecting a rotation of an output shaft of the engine magnetically and determines said engine speed from detected rotation of said output shaft by said pulser coil.

12. The ignition timing control system according to claim 11, further comprising an electric power generator for rectifying and smoothing an output of said pulser coil to generate a DC power and supplying the DC power to various portions of the ignition timing control system.

* * * * *